USO10038477B2

(12) United States Patent
Hutcheson et al.

(10) Patent No.: US 10,038,477 B2
(45) Date of Patent: Jul. 31, 2018

(54) COMBINED ACTIVE AND PASSIVE HIGH-POWER RF PROTECTION CIRCUIT

(71) Applicant: L-3 Communications Corporation, New York, NY (US)

(72) Inventors: George Zohn Hutcheson, Richardson, TX (US); Gregory Dean McIntire, Princeton, TX (US)

(73) Assignee: L-3 Communications Corporation, New York, NY (US)

( * ) Notice: Subject to any disclaimer, the term of this patent is extended or adjusted under 35 U.S.C. 154(b) by 224 days.

(21) Appl. No.: 14/950,404

(22) Filed: Nov. 24, 2015

(65) Prior Publication Data

US 2017/0149238 A1    May 25, 2017

(51) Int. Cl.
| | |
|---|---|
| *H02H 9/02* | (2006.01) |
| *H04B 7/00* | (2006.01) |
| *G01S 7/00* | (2006.01) |
| *G01S 7/03* | (2006.01) |
| *G01S 7/36* | (2006.01) |

(52) U.S. Cl.
CPC .............. *H04B 7/00* (2013.01); *G01S 7/00* (2013.01); *G01S 7/032* (2013.01); *G01S 7/36* (2013.01)

(58) Field of Classification Search
CPC ............... H02H 9/02; H04B 7/00; G01S 7/00
See application file for complete search history.

(56) References Cited

U.S. PATENT DOCUMENTS

| | | | | |
|---|---|---|---|---|
| 7,468,638 | B1* | 12/2008 | Tsai | H04B 1/48 |
| | | | | 331/126 |
| 7,881,065 | B1* | 2/2011 | Youn | H05K 9/0067 |
| | | | | 361/753 |
| 9,124,248 | B2* | 9/2015 | Van Zyl | H01J 37/32183 |
| 2004/0085692 | A1* | 5/2004 | Bodeau | H02J 7/355 |
| | | | | 361/82 |
| 2013/0021113 | A1* | 1/2013 | Bakalski | H04B 1/18 |
| | | | | 333/176 |

OTHER PUBLICATIONS

Department of Defense Interface Standard, "Electromagnetic Environmental Effects Requirements for Systems", MIL-STD-464, Mar. 1997, 116 pgs.
Skyworks Solutions, Inc., "PIN Limiter Diodes in Receiver Protectors", Application Note, Aug. 15, 2008, 12 pgs.
White, Artech House, Inc., "Semiconductor Control", 1977, pp. 246-258.
Macom Technology Solutions, AG312, "Design With PIN Diodes", Rev. V3, Publicly Available Prior to the Nov. 24, 2015 filing date of this application, 18 pgs.
Defense Electronics, Microwaves & RF and Electronic Design, Tubes vs. Transistors, Mar./Apr. 2010, 44 pgs.

* cited by examiner

*Primary Examiner* — Zeev V Kitov
(74) *Attorney, Agent, or Firm* — Egan Peterman Enders Huston

(57) ABSTRACT

An electronic system comprising: 1) an antenna; 2) a transmission line coupled to the antenna; 3) RF electronics circuitry coupled to the transmission line that is sensitive to a high frequency EMI/RF signal on the transmission line; and 4) a protection circuit comprising passive mode circuitry operational when the electronic system is powered off and active mode circuitry operational when the electronic system is powered on.

18 Claims, 3 Drawing Sheets

US 10,038,477 B2

COMBINED ACTIVE AND PASSIVE HIGH-POWER RF PROTECTION CIRCUIT

TECHNICAL FIELD

The present application relates generally to circuitry for suppression of high-power electromagnetic interference (EMI) signals and, more particularly, to radio frequency (RF) protection circuitry for protecting radar, wireless communication, and similar systems from high field strength EMI exposure.

BACKGROUND

Military and commercial electronic systems are often required to withstand exposure to extremely high levels of electromagnetic interference (EMI) and radio frequency (RF) electromagnetic (EM) field levels. Field strengths can exceed 27,000 volts/meter in specific portions of a broader frequency range of 0.01 MHz to 50 GHz (see MIL-STD-464C). Electronic systems must be hardened to withstand exposure to such high-level EMI and EM fields. These requirements apply both when a system is operational (i.e., fully powered and activated) and when a system is non-operational (i.e., deactivated and powered "OFF").

High field strength waves captured by the antenna of radar or wireless communications equipment may induce RF signal levels in the system electronics that greatly exceed the damage threshold of electronic components within the system. Depending upon the specific system, RF levels within the electronics may approach or exceed hundreds or thousands of watts. These electronic systems are susceptible whether powered-on or powered-off. Since antennas and antenna connections for these systems are passive, no special protection is provided when unpowered or deactivated.

Modern practical radar and wireless communications systems depend upon receiver electronics capable of detecting and decoding weak RF signals. Components for such receivers use small semiconductor geometries to effectively amplify weak RF signals to acceptable levels for detection and decoding. The sizes of these semiconductor features are further reduced in receiver components to minimize costs and maximize efficiencies. Damage or destruction to these small semiconductor features will occur when exposed to high RF or EMI levels due to thermal stresses or electrical breakdown. Similar damage may occur to RF control and routing components placed between the system antenna and receiver and to system transmitter components. As a consequence, radar and wireless systems are vulnerable to high field strength EMI and RF events.

Therefore, there is a need for improved circuitry for suppression of high-power electromagnetic interference (EMI) signals. In particular, there is a need for radio frequency (RF) protection circuitry that protects radars and similar systems from high field strength EMI exposure both in the powered "ON" or active state and in the unpowered or "OFF" state.

SUMMARY

To address the above-discussed deficiencies of the prior art, it is a primary object to provide a protection circuit for use in an electronic system including circuitry that is sensitive to a high frequency EMI/RF signal. The protection circuit comprises passive mode circuitry operational when the electronic system is powered OFF. The passive mode circuitry comprises: i) at least one PIN diode (diode comprising an intrinsic semiconductor layer between P-type and N-type semiconductor layers) coupled between a transmission line and ground, wherein the transmission line is coupled between an input of the electronic system and an antenna that receives the high frequency EMI/RF signal and wherein the at least one PIN diode turns on when the high frequency EMI/RF signal on the transmission line exceeds a passive limiter threshold level of the at least one PIN diode; ii) a switch that is closed in passive mode, the switch having a first pole and a second pole, wherein the second pole is coupled to ground; and iii) an inductor coupled between the transmission line and the first pole of the switch.

In one embodiment, the closed switch and the inductor provide a DC return path for charge generated in the at least one PIN diode by the high frequency EMI/RF signal.

In another embodiment, the at least one PIN diode comprises a first PIN diode and a second diode.

In still another embodiment, the first diode has a higher current capacity than the second diode and the second diode has a faster switching speed than the first diode.

In yet another embodiment, the first and second diodes are coupled to the transmission line and separated by approximately a quarter wavelength, wherein the wavelength is in the medium of the transmission line.

In a further embodiment, the protection circuit further comprises active mode circuitry operational when the electronic system is powered on. The active mode circuitry comprises: i) an RF threshold detector for detecting a signal level on the transmission line and determining when the high frequency EMI/RF signal on the transmission line exceeds a predetermined detector threshold level; and ii) a current driver that is turned on when the RF threshold detector determines that the high frequency EMI/RF signal on the transmission line exceeds the predetermined detector threshold level, wherein the switch is open in the active mode and wherein the current driver, when turned on, applies a DC bias current to the at least one PIN diode, the DC bias current activating the at least one PIN diode.

In a still further embodiment, when the switch is open in the active mode, the passive mode circuitry is disabled.

In a yet further embodiment, the RF threshold detector is coupled to the transmission line by an RF directional coupler.

In one embodiment, the current driver applies the DC bias current to the at least one PIN diode through the inductor.

It is another primary object to provide an electronic system comprising: 1) an antenna; 2) a transmission line coupled to the antenna; 3) circuitry coupled to the transmission line that is sensitive to a high frequency EMI/RF signal on the transmission line; and 4) a protection circuit comprising passive mode circuitry operational when the electronic system is powered off and active mode circuitry operational when the electronic system is powered on. The passive mode circuitry comprises: i) at least one PIN diode coupled between the transmission line and ground, wherein the at least one PIN diode turns on when the high frequency EMI/RF signal on the transmission line exceeds a passive limiter threshold level of the at least one PIN diode; ii) a switch that is closed in passive mode, the switch having a first pole and a second pole, wherein the second pole is coupled to ground; and iii) an inductor coupled between the transmission line and the first pole of the switch. The active mode circuitry comprises: iv) an RF threshold detector for detecting a signal level on the transmission line and determining when the high frequency EMI/RF signal on the transmission line exceeds a predetermined detector threshold level; and v) a current driver that is turned on when the RF threshold detector determines that the high frequency EMI/RF signal on the transmission line exceeds the predetermined detector threshold level. The switch is open in the active mode and the current driver, when turned on, applies a DC bias current to the at least one PIN diode, the DC bias current activating the at least one PIN diode.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
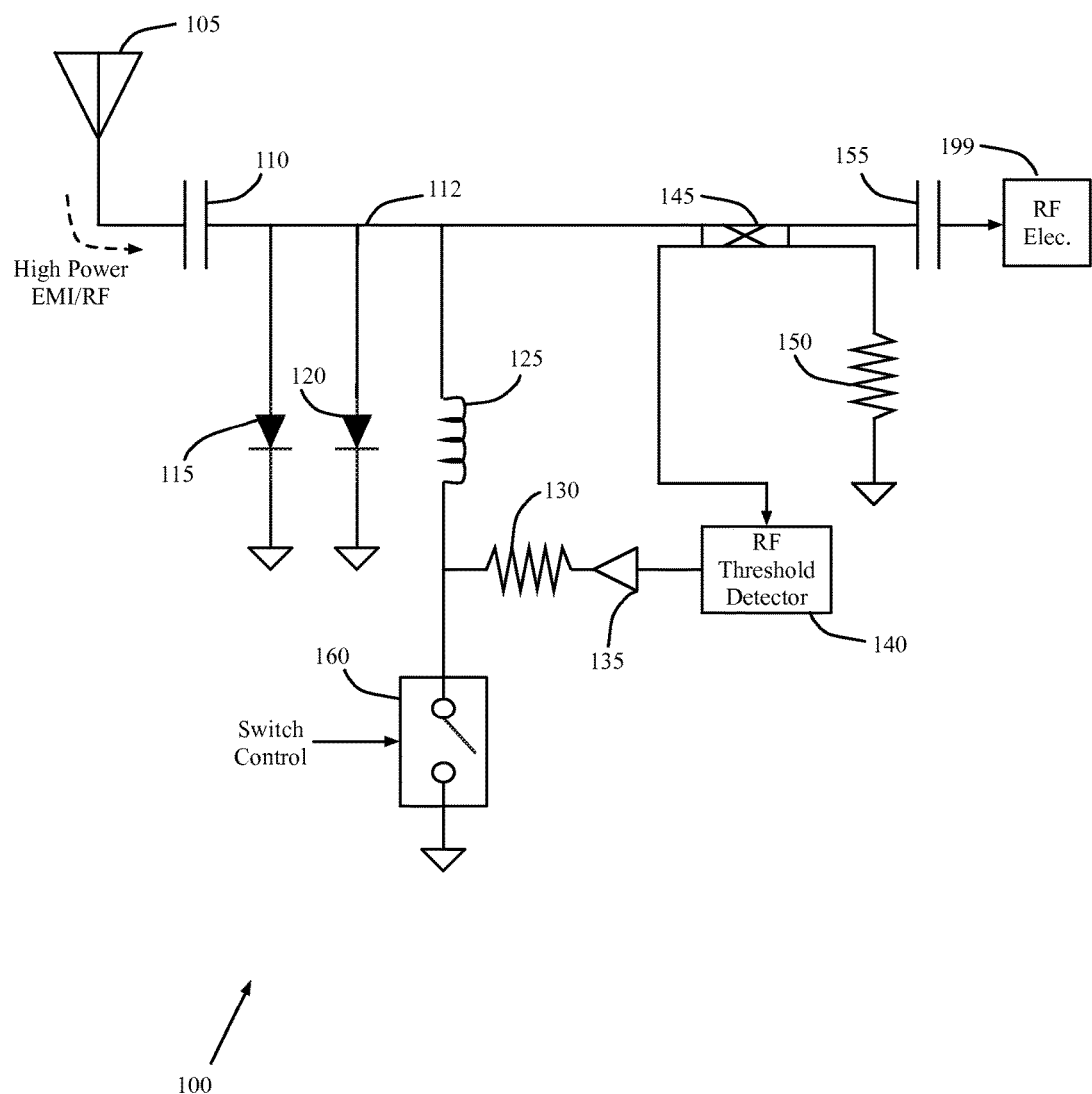
FIG. 1 illustrates a protection circuit according to the principles of the present disclosure.
Figure 2:
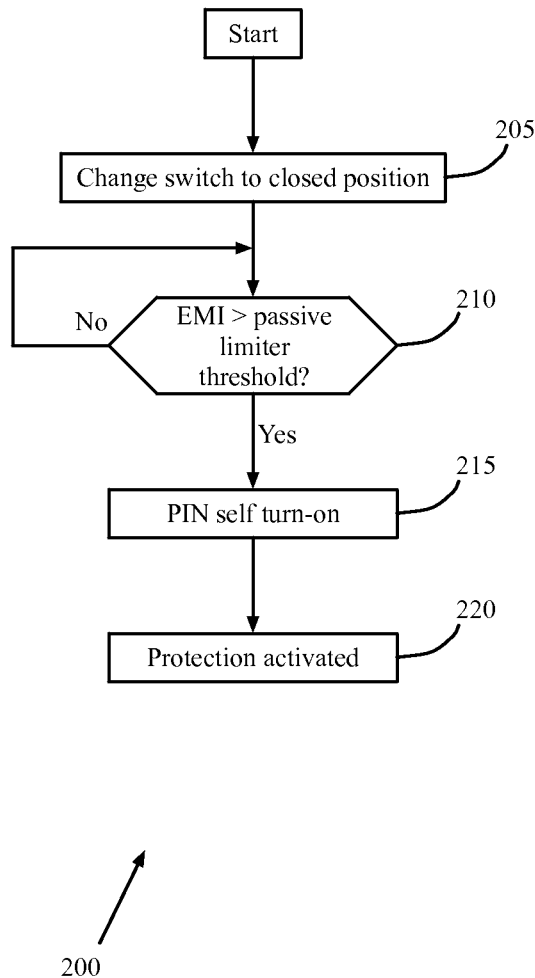
FIG. 2 is a flow diagram illustrating the operation of the protection circuit in the powered OFF or passive mode.
Figure 3:
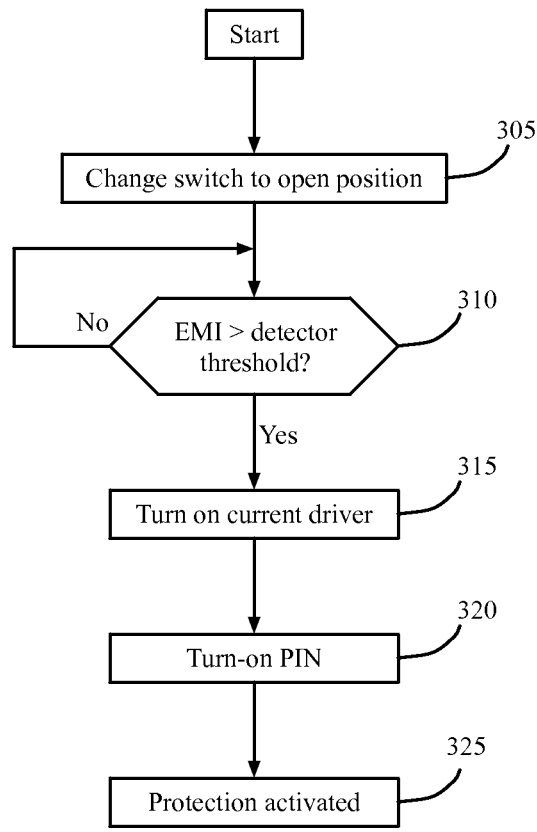
FIG. 3 is a flow diagram illustrating the operation of the protection circuit in the powered ON or active mode.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged radio frequency (RF) system.

The present disclosure describes a combined active and passive high-power radio frequency (RF) protection circuitry to satisfy selected requirements for high field strength electromagnetic interference (EMI) exposure of radar, wireless communications and similar electronic systems. The disclosed protection circuitry provides protection when the RF subsystem (or host system) is powered "ON" and when the RF subsystem/host system is powered "OFF" without impacting to the RF performance of the radar or system when power is ON.

FIG. 1 illustrates protection circuit 100 according to the principles of the present disclosure. Protection circuit 100 comprises antenna 105, coupling capacitor 110, transmission line 112, PIN diodes 115 and 120, RF inductor 125, resistor 130, current driver (or amplifier) 135, RF threshold detector 140, RF directional coupler 145, resistor 150, coupling capacitor 155, switch 160, and RF electronics 199. Protection circuit 100 may be embedded in, or implemented with a variety of high-frequency systems represented by RF electronics 199, including a radar system. Protection circuit 100, including transmission line 112, is coupled to a transceiver or other circuit in RF electronics 199 by directional coupler 145 and coupling capacitor 155.

Protection circuit 100 includes both active and passive circuits, thereby providing protection whether the external system (i.e., RF electronics 199) in which protection circuit 100 is embedded is powered ON or powered OFF. The passive and active modes are controlled by the external system (i.e., RF electronics 199) using a Switch Control signal that operates switch 160. When the external system is OFF (unpowered mode), the Switch Control signal is also OFF, but switch 160 is normally in the closed position when power is OFF. When the external system is ON (powered or active mode), the Switch Control signal from the external system opens switch 160. Switch 160 may be a relay switch, a semiconductor switch, a micro-electromechanical system (MEMS) switch, or another type of electronic or electromechanical switch. But, switch 160 must be normally closed (i.e., low resistance/impedance) when the external system is unpowered. Two modes are used since a purely passive limiter may be activated by the radar transmitter causing reduced transmit power and reduced radar performance.

When PIN diodes 115 and 120 are activated, PIN diodes 115 and 120 form a short circuit to ground between the external system and antenna 105. A high field strength EMI/RF signal that enters transmission line 112 through antenna 105 and coupling capacitor 110 is essentially reflected at the short-circuit and is prevented from entering and damaging the radar electronics or other sensitive devices in the external system.

In the exemplary embodiment, PIN diode 115 may comprise a coarse PIN diode that has a slower switching speed, but higher current capacity, and PIN diode 120 may comprise a fine (or cleanup) diode that has faster switching speed, but lower current capacity. In general, one or more PIN diodes may be use to enhance the isolation and/or switching speed of protection circuit 100. In an exemplary embodiment, PIN diodes 115 and 120 may be separated by one-quarter of a wavelength ($\lambda/4$) along RF transmission line 112, where the wavelength is in the medium of transmission line 112. Alternate embodiments may also include multiple PIN diodes separated by one-quarter wavelength along transmission line 112 or separated by other spacing that provide better protection than a quarter wavelength alone for the specific system or application.

Passive Mode—

When the radar system is unpowered, protection circuit 100 operates as a passive limiter protection circuit. The passive limiter protection circuit comprises PIN diodes 115 and 120, RF inductor 125, and switch 160, which is closed. Once the EMI/RF power levels received from antenna 105 exceed the passive threshold levels of PIN diodes 115 and 120, PIN diodes 115 and 120 are activated (or turned on), thereby providing protection to the radar electronics in the external system.

RF inductor 125 and switch 160 provide a closed DC return path for charge generated in PIN diodes 115 and 120 by the high power EMI/RF signals. Without this DC path, PIN diodes 115 and 120 would not turn on. PIN diodes 115 and 120 must be selected to have passive threshold level below the damage threshold for components in the external system (typically, the T/R switch). These passive threshold levels may be below the radar transmitter output power levels. Also, RF inductor 125 acts as an RF choke that prevents RF power loss through switch 160 when no protection is needed.

FIG. 2 depicts flow diagram 200, which illustrates the operation of protection circuit 100 in the powered OFF state (or passive mode). Initially, power is removed from the external system (i.e., RF electronics 199) and from protection circuit 100 and switch 160 is in the closed position (step 205). The EMI/RF signals received from antenna 105 are continually sensed to determine if the EMI/RF signal is below the passive limiter threshold level of PIN diodes 115 and 120 (step 210). If the EMI/RF signal level remains below the passive limiter threshold level (NO in step 210), protection circuit 100 continues to sense the EMI/RF signals. However, if the EMI/RF signal level exceeds the passive limiter threshold level (YES in step 210), PIN diodes in protection circuit 100 turn on by themselves (step 215). Once turned ON, PIN diodes 115 and 120 short transmission line 112 to ground, thereby providing protection to the transceiver electronics and other components in the external system by reflecting any high field strength EMI/RF signal that enters transmission line 112 through antenna 105 (step 220).

Active Mode—

When the external radar system is powered and operational, protection circuit 100 operates as an active protection circuit. The active protection circuit comprises PIN diodes 115 and 120, RF directional coupler 145, RF threshold detector 140, current driver (or amplifier) 135, resistors 130 and 150, RF inductor 125, and switch 160. Resistor 150 is a termination resistor for RF directional coupler 145. RF directional coupler 145 is shown only by way of example. Those skilled in the art will readily understand that other devices that perform the same function may replace RF directional coupler 145. These substitutes include resistive taps or high impedance probes, hybrid couplers of various forms, microstrip and stripline couplers, coupled line couplers, Lange couplers, and power splitters.

In the active mode, the Switch Control signal received from the external system opens switch 160 (i.e., very high impedance or open circuited). The Switch Control signal may simply be the DC voltage from the external system power supply or may be a signal from the external system controller (e.g., system processor, controller, or digital state machine). Once switch 160 is open, protection circuit 100 will not operate as a passive limiter as described above.

In the active mode, a small percentage of the high power EMI/RF signal on transmission line 112 is captured by RF directional coupler 145 and is sent to RF threshold detector 140. When the EMI/RF signal at the input of RF threshold detector 140 is above a predetermined system threshold level, RF threshold detector 140 outputs a signal to current driver 135. Current driver 135 in turn applies DC bias currents into PIN diodes 115 and 120 through resistor 130 and RF inductor 125. The bias currents turn ON or activate PIN diodes 115 and 120. Once activated, PIN diodes 115 and 120 provide protection to the radar electronics from the high power EMI/RF signal. Resistor 130 limits the DC current applied to PIN diodes 115 and 120, thereby preventing possible damage by excessive current to PIN diodes 115 and 120. RF inductor 125 again acts as an RF choke that prevents RF power loss through switch 160 or current driver 135 when no protection is needed.

FIG. 3 depicts flow diagram 300, which illustrates the operation of protection circuit 100 in the powered ON state (or active mode). Initially, power is applied to the external system and protection circuit 100 and switch 160 is placed in the opened position (step 305). The EMI/RF signals received from antenna 105 are continually monitored to determine if the EMI/RF signal is below the predetermined threshold level of RF threshold detector 140 (step 310). If the EMI/RF signal level remains below the predetermined threshold level of RF threshold detector 140 (NO in step 310), protection circuit 100 continues to monitor the EMI/RF signals. However, if the EMI/RF signal level exceeds the predetermined threshold level of RF threshold detector 140 (YES in step 310), RF threshold detector 140 turns on current driver 135 (step 315). The output signal from current driver 135 turns on PIN diodes 115 and 120 (step 320), thereby providing protection to the radar electronics in the external system (step 325).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in an electronic system including circuitry that is sensitive to a high frequency EMI/RF signal, a protection circuit comprising:
    passive mode circuitry operational when the electronic system is powered off, the passive mode circuitry comprising:
        at least one PIN diode coupled between a transmission line and ground, wherein the transmission line is coupled between an input of the electronic system and an antenna that receives the high frequency EMI/RF signal and wherein the at least one PIN diode turns on when the high frequency EMI/RF signal on the transmission line exceeds a passive limiter threshold level of the at least one PIN diode,
        a switch that is closed in a passive mode, the switch having a first pole and a second pole, wherein the second pole is coupled to ground, and
        an inductor coupled between the transmission line and the first pole of the switch; and
    active mode circuitry operational when the electronic system is powered on, the active mode circuitry comprising:
        an RF threshold detector for detecting a signal level on the transmission line and determining when the high frequency EMI/RF signal on the transmission line exceeds a predetermined detector threshold level, and
        a current driver that is turned on when the RF threshold detector determines that the high frequency EMI/RF signal on the transmission line exceeds the predetermined detector threshold level,
    wherein the switch is open in an active mode and wherein the current driver, when turned on, applies a DC bias current to the at least one PIN diode, the DC bias current activating the at least one PIN diode.

2. The protection circuit as set forth in claim 1, wherein, when the switch is open in the active mode, the passive mode circuitry is disabled.

3. The protection circuit as set forth in claim 1, wherein the RF threshold detector is coupled to the transmission line by an RF directional coupler.

4. The protection circuit as set forth in claim 1, wherein the current driver applies the DC bias current to the at least one PIN diode through the inductor.

5. An electronic system comprising:
    an antenna;
    a transmission line coupled to the antenna;

RF electronics circuitry coupled to the transmission line that is sensitive to a high frequency EMI/RF signal on the transmission line; and a protection circuit comprising:
   passive mode circuitry operational when the electronic system is powered OFF, the passive mode circuitry comprising:
      at least one PIN diode coupled between the transmission line and ground, wherein the at least one PIN diode turns on when the high frequency EMI/RF signal on the transmission line exceeds a passive limiter threshold level of the at least one PIN diode,
      a switch that is closed in a passive mode, the switch having a first pole and a second pole, wherein the second pole is coupled to ground, and
      an inductor coupled between the transmission line and the first pole of the switch; and
   active mode circuitry operational when the electronic system is powered ON, the active mode circuitry comprising:
      an RF threshold detector for detecting a signal level on the transmission line and determining when the high frequency EMI/RF signal on the transmission line exceeds a predetermined detector threshold level,
      a current driver that is turned on when the RF threshold detector determines that the high frequency EMI/RF signal on the transmission line exceeds the predetermined detector threshold level;
   wherein the switch is open in an active mode and wherein the current driver, when turned on, applies a DC bias current to the at least one PIN diode, the DC bias current activating the at least one PIN diode.

6. The electronic system as set forth in claim 5, wherein, when the switch is open in the active mode, the passive mode circuitry is disabled.

7. The electronic system as set forth in claim 5, wherein the RF threshold detector is coupled to the transmission line by an RF directional coupler.

8. The electronic system as set forth in claim 5, wherein the current driver applies the DC bias current to the at least one PIN diode through the inductor.

9. The electronic system as set forth in claim 5, wherein the closed switch and the inductor provide a DC return path for charge generated in the at least one PIN diode by the high frequency EMI/RF signal.

10. The electronic system as set forth in claim 5, wherein the at least one PIN diode comprises a first PIN diode and a second diode.

11. The electronic system as set forth in claim 10, wherein the first diode has a higher current capacity than the second diode.

12. The electronic system as set forth in claim 11, wherein the second diode has a faster switching speed than the first diode.

13. The electronic system as set forth in claim 12, wherein the first and second diodes are coupled to the transmission line and separated by approximately a quarter wavelength, wherein the wavelength is in the medium of the transmission line.

14. The protection circuit as set forth in claim 1, wherein the closed switch and the inductor provide a DC return path for charge generated in the at least one PIN diode by the high frequency EMI/RF signal.

15. The protection circuit as set forth in claim 1, wherein the at least one PIN diode comprises a first PIN diode and a second diode.

16. The protection circuit as set forth in claim 15, wherein the first diode has a higher current capacity than the second diode.

17. The protection circuit as set forth in claim 16, wherein the second diode has a faster switching speed than the first diode.

18. The protection circuit as set forth in claim 17, wherein the first and second diodes are coupled to the transmission line and separated by approximately a quarter wavelength, wherein the wavelength is in the medium of the transmission line.

* * * * *